June 17, 1952  V. W. FARRIS  2,600,493
PINCH VALVE

Filed May 19, 1948  2 SHEETS—SHEET 1

INVENTOR
VICTOR W. FARRIS
BY Bernard H. Remlein
ATTORNEY

June 17, 1952
V. W. FARRIS
2,600,493
PINCH VALVE
Filed May 19, 1948
2 SHEETS—SHEET 2
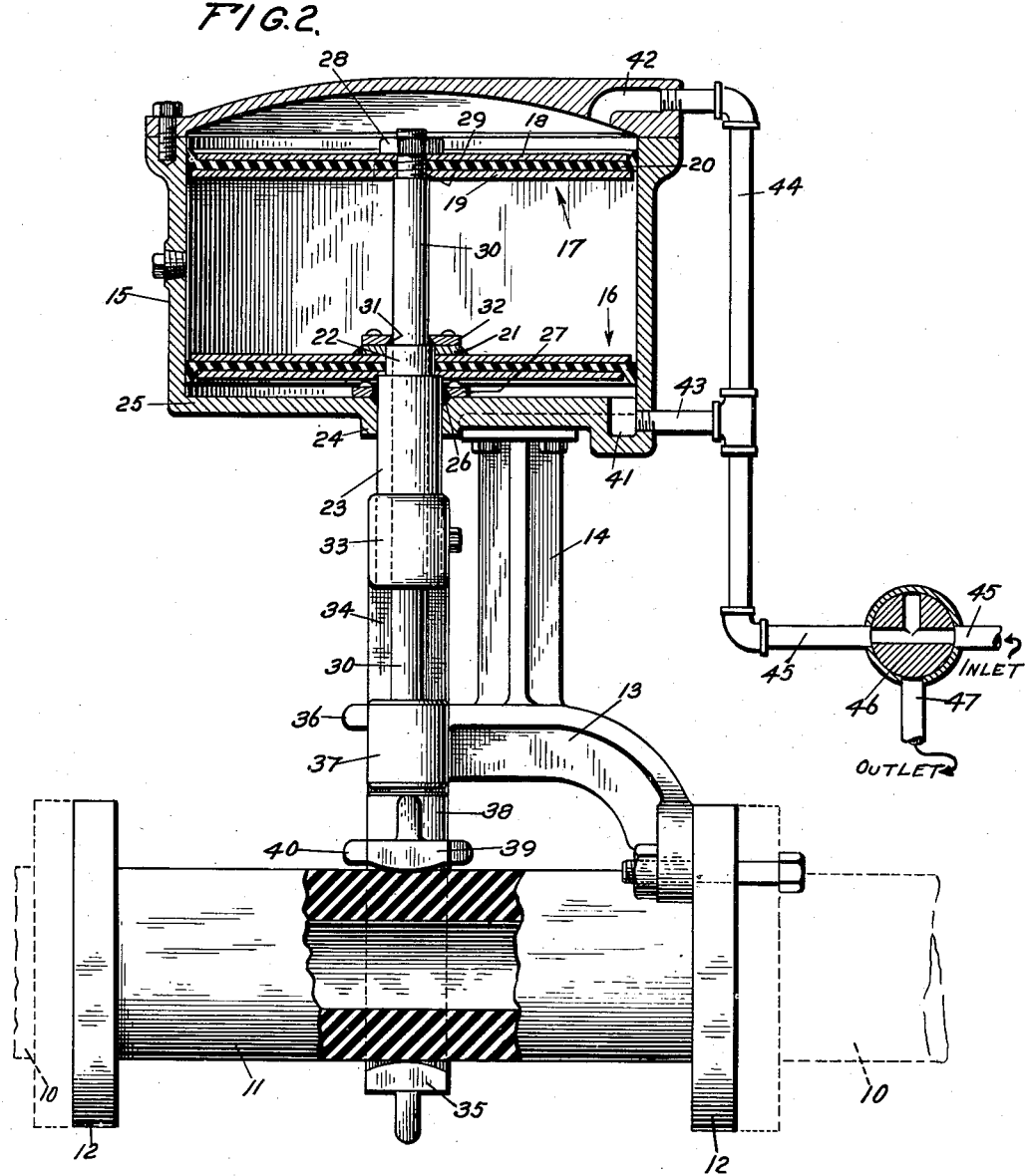
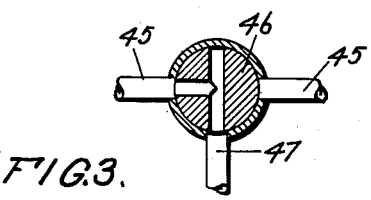
INVENTOR
VICTOR W. FARRIS
BY Bernard H. Lemlein
ATTORNEY Patented June 17, 1952

2,600,493

UNITED STATES PATENT OFFICE 2,600,493

PINCH VALVE

Victor W. Farris, Tenefly, N. J.

Application May 19, 1948, Serial No. 27,922

6 Claims. (Cl. 137—139)

This invention relates to valves, and more particularly, to valves for use in controlling the flow of liquids which ordinarily deleteriously affect valves of conventional, metallic construction.

One of the objects of this invention is the provision of a simple and effective valve of the type known as a pinch valve.

Another object of this invention is the provision of a long-lasting pinch valve capable of withstanding attacks by strongly corrosive liquids such as are handled, for example, in various branches of the chemical industry.

A further object of this invention is the provision of a pinch valve which is speedily and accurately responsive to remotely located control mechanism.

These, and other objects, which will become apparent as the detailed description herein progresses, are attained herein in the following manner:

The conduit through which flows the liquid to be controlled is provided with a section made of corrosion-resistant, flexible material. The walls of this flexible section are engaged at diametrically opposed points by pinching means, such as a pair of jaws. The latter are coupled, respectively, to suitable pistons slidably mounted for reciprocation in opposite directions in a housing which constitutes, in effect, a cylinder. Preferably, the coupling between the jaws and the pistons is accomplished through a pair of telescoping members, one of which is slidably mounted in a wall of the housing, and the other of which is slidably mounted within said first member. The housing is provided with inlet-outlet ports communicating in parallel with a source of pressure-exerting fluid adapted, when permitted to flow to said housing, to urge the pistons and jaws coupled thereto toward each other, thereby to pinch the flexible walls of the above referred to section of the conduit through which the liquid to be controlled is flowing, this action, of course, reducing the flow of such liquid. The communication between the source of pressure-exerting fluid and the housing includes means, for example, a 3-way valve, to effect this result. Such a 3-way valve, when appropriately adjusted, can interrupt the flow of the pressure-exerting fluid to the housing and permit the back pressure of the liquid under control to act against the force of the jaws, pistons and pressure-exerting fluid to return the valve to its initial, free-flowing condition.

In the accompanying specification there shall be described, and in the annexed drawings shown, an illustrative embodiment of the valves of the present invention. It is, however, to be clearly understood that the present invention is not to be limited to the aforesaid illustrative embodiment, inasmuch as changes therein may be made within the spirit and scope of the claims hereto appended.

In said drawings,

Fig. 2 is a partially side elevational, partially vertical sectional view of the same, said view showing the 3-way valve in its "open" position; and Fig. 3 is a transverse sectional view of the 3-way valve shown in Fig. 2 in its "closed" position.

Figure 1:
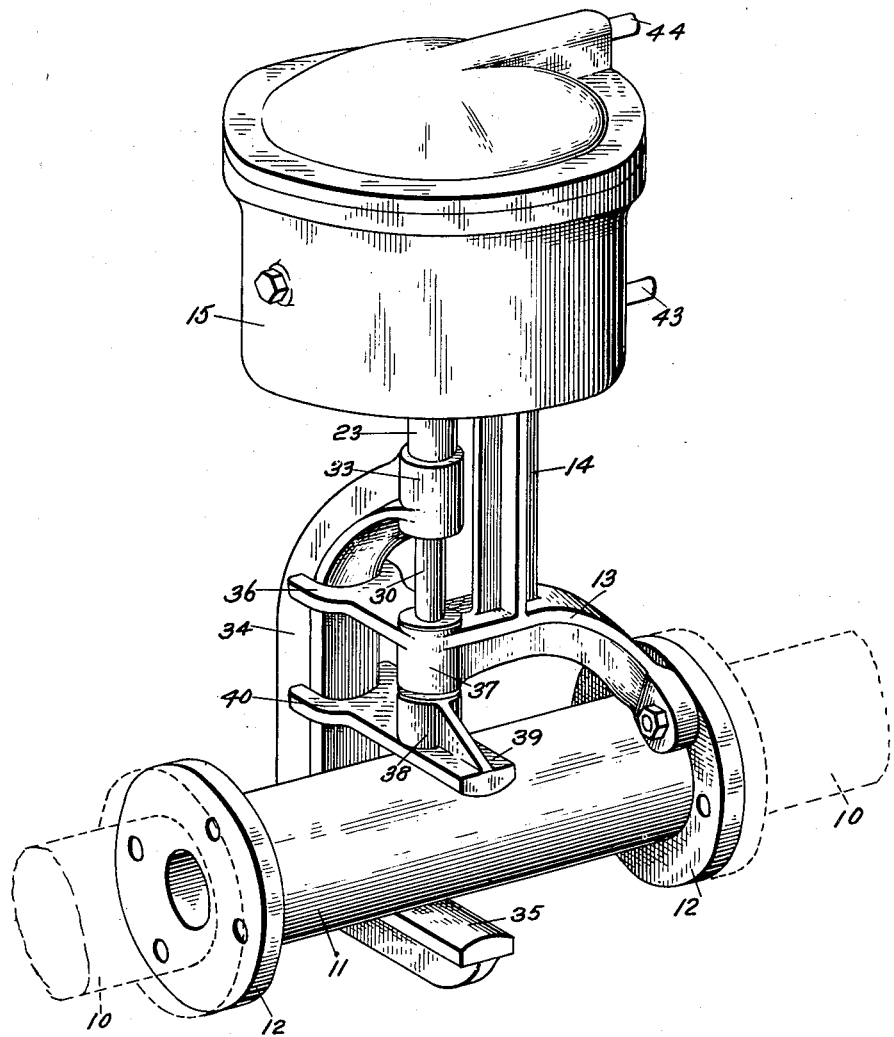
Fig. 1 is a perspective view of a pinch valve assembled in accordance with the present invention.

Referring now more in detail to the aforesaid illustrative embodiment of the present invention, with particular reference to Figs. 1 and 2 of the drawings, the numeral 10 designates a conduit through which the flow of corroding liquids is to be controlled. Said conduit includes a section 11 made of appropriately corrosion-resistant and flexible material, said section being bolted or otherwise secured to the adjacent portions of the conduit 10 by means of the rigid coupling flanges 12.

Secured to one of the flanges 12 is an arcuate frame member 13 from which rises a standard 14, and secured to the latter element is a cylindrical housing 15.

Slidably mounted in the housing 15 is a pair of pistons 16 and 17, each including a pair of metal discs 18 and 19 adapted to support therebetween a packing disc 20. The discs 20 may be made, for example, of leather, and engage the side walls of the housing 15 at their peripheries.

The piston 16 is secured by a collar 21 on a reduced portion 22 formed at the inner end of a tubular member 23, said member being slidably mounted in a boss 24 formed in the lower wall 25 of the housing 15. The housing 15 is made fluid-tight about the junction of the member 23 and boss 24 by a suitable packing 26 held in place by a collar 27 secured, for example, by rivets, to the lower wall 25 of said housing.

The piston 17 is secured by a nut 28 on the threaded inner end 29 of a rod or tubular member 30 which is slidably mounted within the member 23, the junction between the telescoped members 23 and 30 being made fluid-tight by a suitable packing 31 held in place by a collar 32 carried by the collar 21.

Secured on the outer end of the member 23 is a collar 33 formed on a ribbed C-clamp 34 provided with a jaw portion 35 in engagement with the underside of the conduit section 11, the body of the clamp being slidably engaged by a guiding member 36 extending outwardly from a boss 37 formed on the frame member 13.

The lower end of the tubular member 30 is guided in the boss 37 and has secured at the lower end thereof a boss 38 formed on a jaw 39 in engagement with the upper side of the conduit section 11, at a point diametrically opposite the point of engagement between said conduit section 11 and the lower jaw member 35.

A second guiding member 40, formed with the jaw 39, extends outwardly therefrom and slidably engages the C-clamp 34.

The housing 15 is provided with inlet-outlet ports 41 and 42 located, respectively, below the disc 16 and above the disc 17, said ports communicating, respectively, through pipes 43 and 44 with a common pipe 45, in turn, communicating with a source (not shown) of pressure-exerting fluid such as air, water, oil or the like.

The pipe 45 includes a 3-way valve 46 for controlling the flow of the above referred to pressure-exerting fluid from the above referred to source thereof to the housing 15, or from said housing 15 to an outlet pipe 47 which may be returned to said source or, merely, communicate with the atmosphere.

This completes the description of the aforesaid illustrative embodiment of the present invention and the mode of operation thereof may be summarized as follows:

With the discs 16 and 17 in the positions shown in Fig. 2 of the drawings, the jaws 35 and 39 are open to their maximum extent, permitting the free flow of the liquid to be controlled through the conduit 10 including the flexible section 11.

With the valve 46 in the position shown in said Fig. 2, the pressure-exerting fluid passes freely through the pipes 45, 43 and 44 to the housing 15 through the ports 41 and 42. Pressure is thereby exerted against the lower surface of the disc 16 and against the upper surface of the disc 17, causing said discs to approach each other. The upward movement of the disc 16 draws the jaw 35 which is coupled thereto upwardly, while at the same time, the downward movement of the disc 17 forces the jaw 39 which is coupled thereto downwardly. Thus, the jaws 35 and 39 constrict the flexible walls of the conduit section 11, closing the same off and thereby controlling the flow of liquid therethrough. Obviously, by rotating the valve 46 counter-clockwise through an angle of less than 90 degrees at any time during the closing action of the jaws 35 and 39, the latter can be maintained at their then position. This permits the rate of flow through the conduit 10 to be controlled without limitation merely to a completely open or a completely closed condition.

By rotating the valve 46 counter-clockwise through an angle of 90 degrees with respect to the position shown in Fig. 2, as shown in Fig. 3, the back pressure of the liquid flowing through the conduit section 11 is free to urge the jaws 35 and 39 outwardly. This causes the discs 16 and 17 to be returned toward their initial positions which, in turn, forces the pressure-exerting fluid out of the housing 15, through the pipes 43, 44 and 45, through the valve 46, and through the pipe 47 to the original source or to the atmosphere.

This completes the description of the mode of operation of the aforesaid illustrative embodiment of the present invention.

It will be noted from all of the foregoing that a simple and effective pinch valve for use with corrosive liquids has been provided. It will further be noted that the nature of the valve is such that said valve is inherently long-lasting, and it is capable of speedy and accurate response to remotely located control mechanism.

Other objects and advantages of the present invention will readily occur to those skilled in the art to which the same relates.

What is claimed is:

1. A valve comprising: a conduit having normally distended flexible walls; pinching means engaging said walls at diametrically opposed points; a fluid tight housing; a pair of pistons slidably engaging the interior walls of said housing and being mounted therein for simultaneous movement in opposite directions; said pistons being coupled to said pinching means; and means, communicating with said housing, for conveying a pressure-exerting fluid simultaneously to said pistons, thereby to actuate said pinching means and constrict said walls.

2. A valve comprising: a conduit having normally distended flexible walls; pinching means engaging said walls at diametrically opposed points; a fluid-tight housing; a pair of pistons slidably engaging the interior walls of said housing and being mounted therein for simultaneous movement in opposite directions; said pistons being coupled to said pinching means; and means, communicating with said housing for conveying a pressure-exerting fluid simultaneously to and simultaneously from said pistons, respectively, to actuate said pinching means and constrict said walls, and permit expansion of said walls against the action of said pinching means.

3. A valve comprising: a conduit having normally distended flexible walls; a pair of jaws engaging said walls at diametrically opposed points; a fluid-tight housing, a pair of pistons slidably engaging the interior walls of said housing and mounted therein for simultaneous movement in opposite directions; a first tubular member slidably mounted in said housing, and coupling one of said jaws to one of said pistons; a second tubular member slidably mounted in said first tubular member, and coupling the other of said jaws to the other of said pistons; and means, communicating with said housing, for conveying a pressure-exerting fluid simultaneously to said pistons, thereby to actuate said jaws and constrict said walls.

4. A valve comprising: a conduit having normally distended flexible walls; a housing carried by said conduit; a pair of telescoped members extending into said housing, and having pinching jaws at the exterior ends thereof in engagement with the walls of said conduit at diametrically opposed points; a pair of pistons slidably mounted in said housing and secured, respectively, to the interior ends of said telescoped members; and means, communicating with said housing, for conveying a pressure-exerting fluid to said pistons, thereby to actuate said pinching jaws and constrict the walls of said conduit.

5. A valve comprising: a conduit having normally distended flexible walls; a fluid-tight housing having inlet-outlet ports; means, connected in parallel with said inlet-outlet ports, for controlling the flow of a pressure-exerting fluid to and from the interior of said housing; a pair of pistons slidably engaging the interior walls of said housing intermediate said inlet-outlet ports; a pair of pinching jaws engaging said conduit at diametrically opposed points on the walls thereof; and coupling means connecting said pistons, respectively, with said jaws.

6. A valve comprising: a conduit having normally distended flexible walls; a housing having inlet-outlet ports; means, connected in parallel with said inlet-outlet ports, for controlling the flow of a pressure-exerting fluid to and from said housing; a pair of pistons slidably mounted in said housing for movement in opposite directions intermediate said inlet-outlet ports; a pair of pinching jaws engaging said conduit at diametrically opposed points on the walls thereof; and a pair of telescoping coupling members extending through a wall of said housing, each of said coupling members connecting one of said pistons with one of said jaws.

VICTOR W. FARRIS.

REFERENCES CITED

The following references are of record in the file of this patent:

UNITED STATES PATENTS

| Number | Name | Date |
| --- | --- | --- |
| 726,962 | Metzger | May 5, 1903 |
| 2,150,262 | Brittain | Mar. 14, 1939 |
| 2,305,840 | Brown | Dec. 22, 1942 |
| 2,371,434 | Eppler | Mar. 13, 1945 |
| 2,409,768 | Lavett | Oct. 22, 1946 |

FOREIGN PATENTS

| Number | Country | Date |
| --- | --- | --- |
| 257,902 | Great Britain | of 1927 |